(12) United States Patent
Yu

(10) Patent No.: US 11,973,399 B2
(45) Date of Patent: Apr. 30, 2024

(54) FAN MODULE

(71) Applicant: ASUSTeK COMPUTER INC., Taipei (TW)

(72) Inventor: Ching Jen Yu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 88 days.

(21) Appl. No.: 17/676,794

(22) Filed: Feb. 21, 2022

(65) Prior Publication Data

US 2022/0399775 A1    Dec. 15, 2022

(30) Foreign Application Priority Data

Jun. 15, 2021  (TW) .................................. 110206864

(51) Int. Cl.
*H02K 5/20* (2006.01)
*H02K 9/06* (2006.01)

(52) U.S. Cl.
CPC ............... *H02K 5/207* (2021.01); *H02K 9/06* (2013.01); *H02K 2205/09* (2013.01)

(58) Field of Classification Search
CPC ........ F04D 25/02; F04D 25/08; F04D 25/166; F04D 25/06; F04D 25/026; F04D 25/0613; H02K 5/18
USPC .......................................................... 415/230
See application file for complete search history.

(56) References Cited

U.S. PATENT DOCUMENTS

| | | | |
|---|---|---|---|
| 5,539,263 A * | 7/1996 | Lee | F04D 25/08 416/162 |
| 10,954,946 B2 | 3/2021 | Yeh et al. | |
| 2006/0093475 A1* | 5/2006 | Liu | F04D 25/0613 415/176 |
| 2013/0259667 A1* | 10/2013 | Huang | F04D 25/06 415/185 |

(Continued)

FOREIGN PATENT DOCUMENTS

| CN | 101163781 A * | 4/2008 | .......... C10M 169/00 |
|---|---|---|---|
| CN | 203453091 | 2/2014 | |

(Continued)

OTHER PUBLICATIONS

CN-101163781-A—Machine Translation (Year: 2008).*
WO-2020211896-A1_Machine Translation (Year: 2020).*

*Primary Examiner* — Tran N Nguyen
*Assistant Examiner* — Masoud Vaziri
(74) *Attorney, Agent, or Firm* — JCIPRNET

(57) ABSTRACT

A fan module including a first casing, a second casing, a supporting assembly, a stator assembly, and a rotor assembly. The first casing includes a first vent. The second casing is connected to the first casing and an accommodating space is formed between the first casing and the second casing. The supporting assembly is disposed at the accommodating space, connected to the second casing, and includes a first end and a second end. The stator assembly is disposed at the accommodating space, fixed on the second casing, and disposed around the supporting assembly. The rotor assembly is disposed at the accommodating space, rotatably disposed around the stator assembly, and corresponding to the first vent. The first end of the supporting assembly passes through the rotor assembly and the first vent for protruding out of the first casing.

7 Claims, 8 Drawing Sheets

(56) References Cited

U.S. PATENT DOCUMENTS

| | | | | |
|---|---|---|---|---|
| 2014/0119909 A1* | 5/2014 | Chiang | ............... | F04D 17/105 |
| | | | | 415/208.1 |
| 2015/0098844 A1* | 4/2015 | Hsu | ................. | H05K 7/20172 |
| | | | | 417/354 |
| 2018/0235103 A1* | 8/2018 | Yeh | .................... | F04D 25/064 |
| 2020/0309138 A1* | 10/2020 | Tsai | ................... | F04D 27/002 |
| 2021/0148378 A1* | 5/2021 | Wang | .................. | F04D 29/053 |

FOREIGN PATENT DOCUMENTS

| | | | | |
|---|---|---|---|---|
| CN | 108425866 | 8/2020 | | |
| WO | WO-2020211896 A1 * | 10/2020 | ............ | F16C 19/364 |

* cited by examiner

FAN MODULE

CROSS-REFERENCE TO RELATED APPLICATION

This application claims the priority benefit of Taiwan application serial no. 110206864, filed on Jun. 15, 2021. The entirety of the above-mentioned patent application is hereby incorporated by reference herein and made a part of this specification.

BACKGROUND

Technical Field

The disclosure relates to a fan, and in particular, to a fan module adapted for an electronic device.

Description of Related Art

Conventional electronic devices are designed with a thin casing for portability. However, this feature leads to some disadvantages such as weak casing strength and smaller space inside the casing. Besides, a gap between a fan in an electronic device and a casing of the electronic device is small. When the thin casing is under external force, the casing tends to deform due to its relatively weak structure strength and press the fan to interfere the rotation direction of the fan. Noise may be generated and the heat dissipation efficiency is not easy to be maintained.

SUMMARY

The disclosure is directed to a fan module including a first casing, a second casing, a supporting assembly, a stator assembly, and a rotator assembly. The first casing includes a first vent. The second casing is connected to the first casing to form an accommodating space. The supporting assembly is located at the accommodating space and is disposed on the second casing. The supporting assembly includes a first end and a second end. The stator assembly is located at the accommodating space. The stator assembly is disposed on the second casing and is disposed around the supporting assembly. The rotator assembly is located at the accommodating space. The rotator assembly is rotatably disposed around the stator assembly and corresponds to the first vent of the first casing. The first end of the supporting assembly passes through the rotator assembly and the first vent and protrudes out of the first casing. The second end protrudes out of the second casing.

The fan module of the disclosure is adapted for an electronic device, which respectively protrudes out of the first casing and the second casing though the first end and the second end of the supporting assembly. When the fan module is adapted for an electronic device, the first end and the second end are configured to support a casing of the electronic device to increase its strength, which prevents the casing from deformation under force and interfering a rotation direction of the fan module and prevents noise generated due to the mutual interference. Furthermore, the interference of the casing and the fan module is reduced to increase the service life of the fan module and maintain the heat dissipation efficiency.

DESCRIPTION OF THE EMBODIMENTS

Figure 1A:
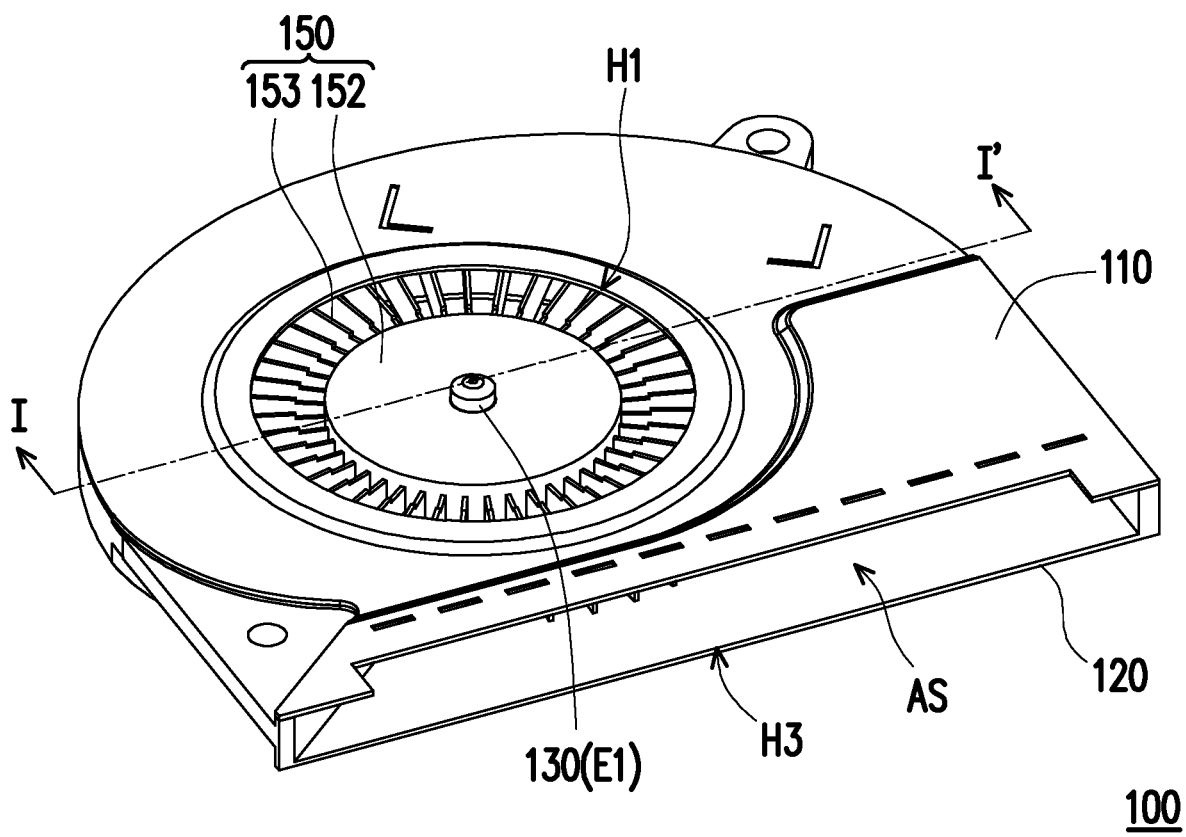
FIG. 1A is a schematic perspective view of a fan module according to an embodiment of the disclosure.
Figure 1B:
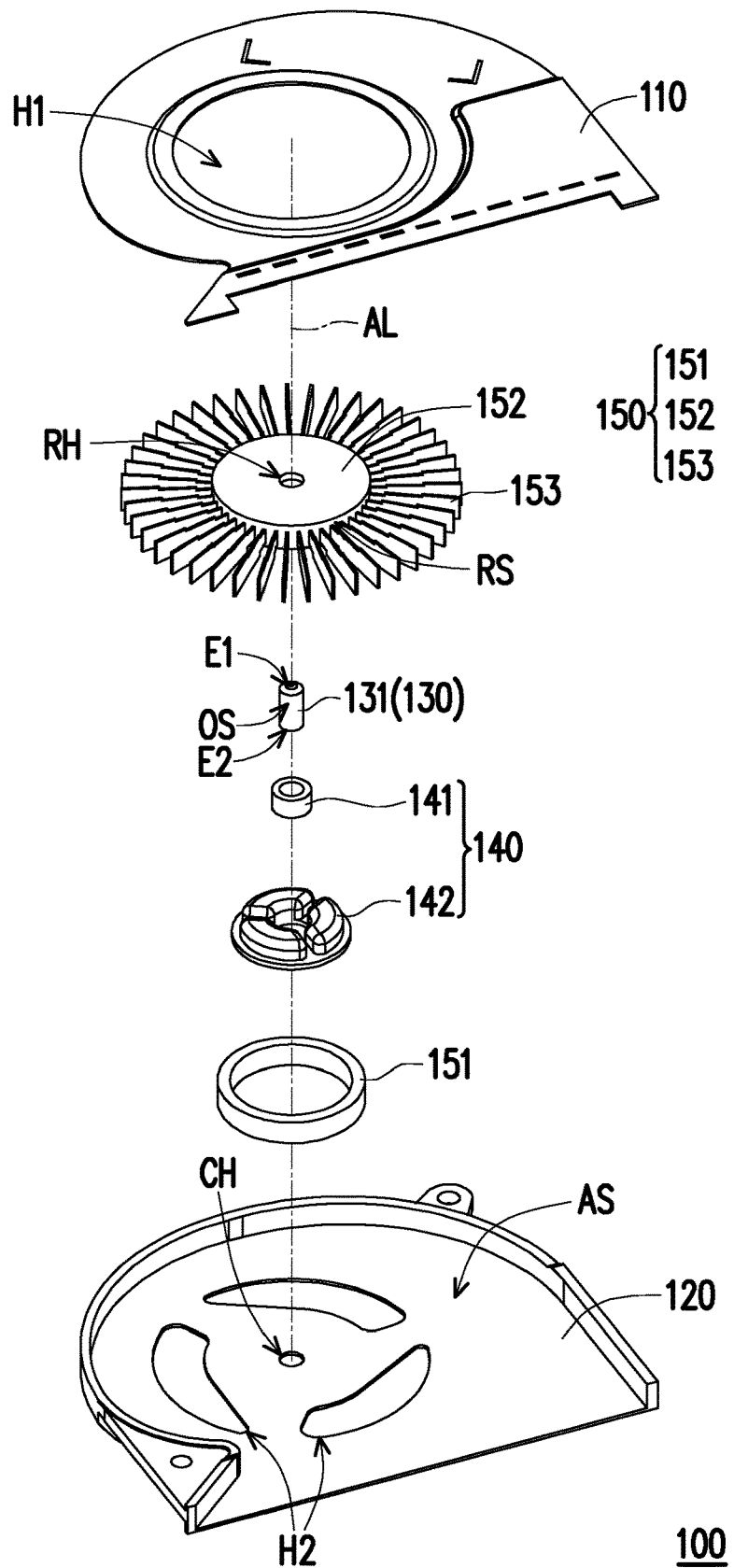
FIG. 1B is a schematic exploded view of the elements of the fan module in FIG. 1A combined with a supporting assembly.
Figure 1C:
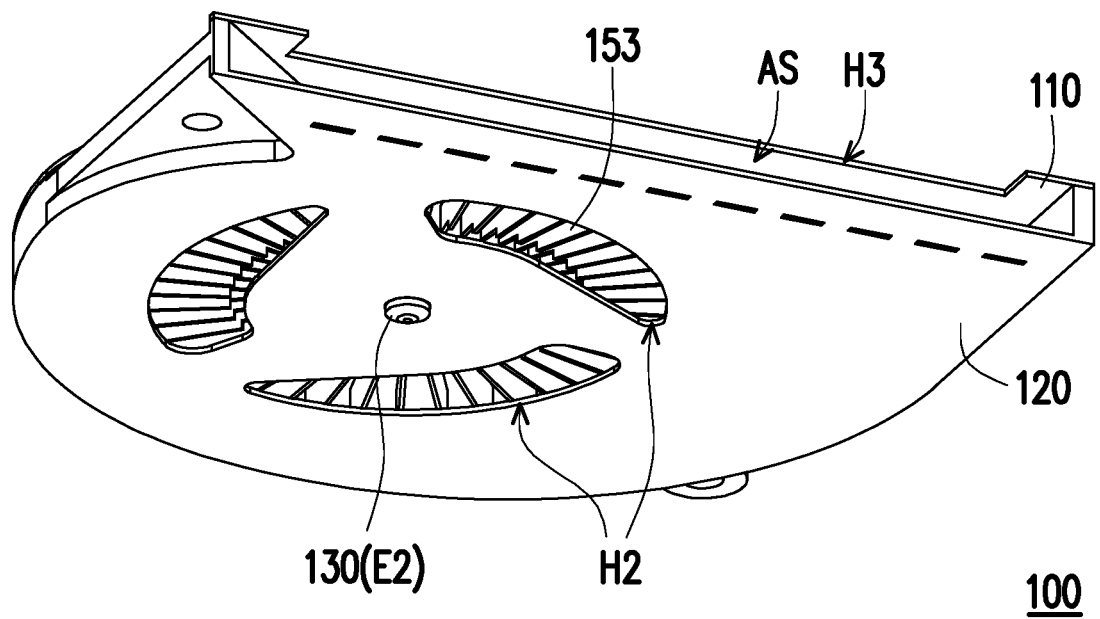
FIG. 1C is a schematic perspective view of the fan module in FIG. 1A viewed from another direction.
Figure 1D:
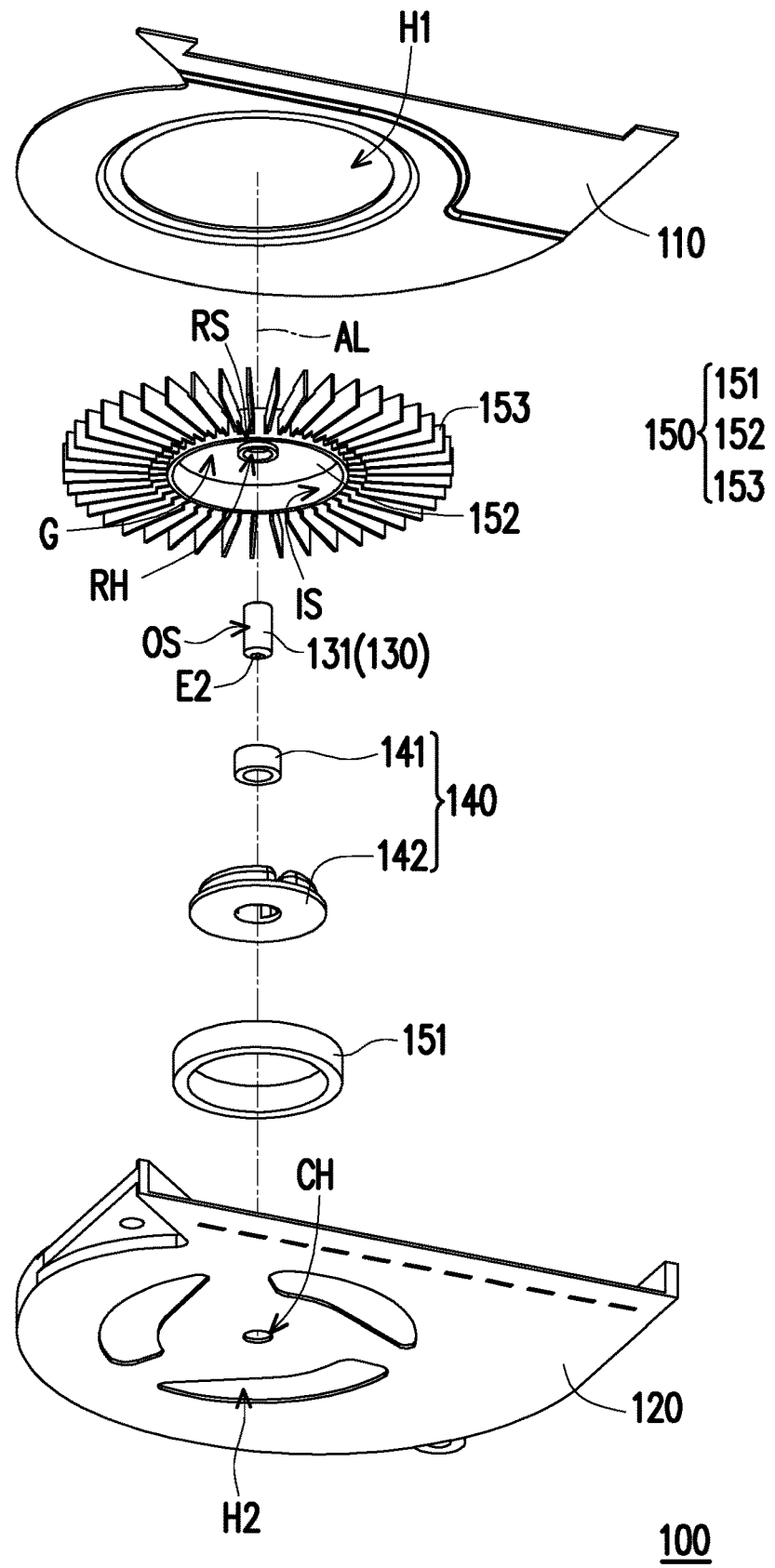
FIG. 1D is a schematic exploded view of the elements of the fan module in FIG. 1C.
Figure 2A:
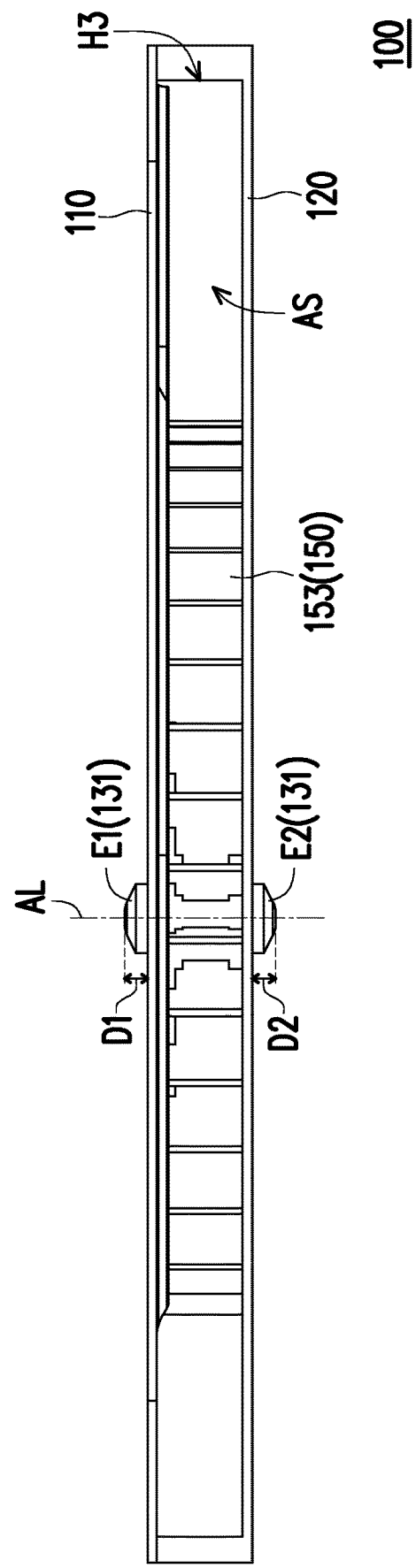
FIG. 2A is a schematic planar side-view of the fan module in FIG. 1A.
Figure 2B:
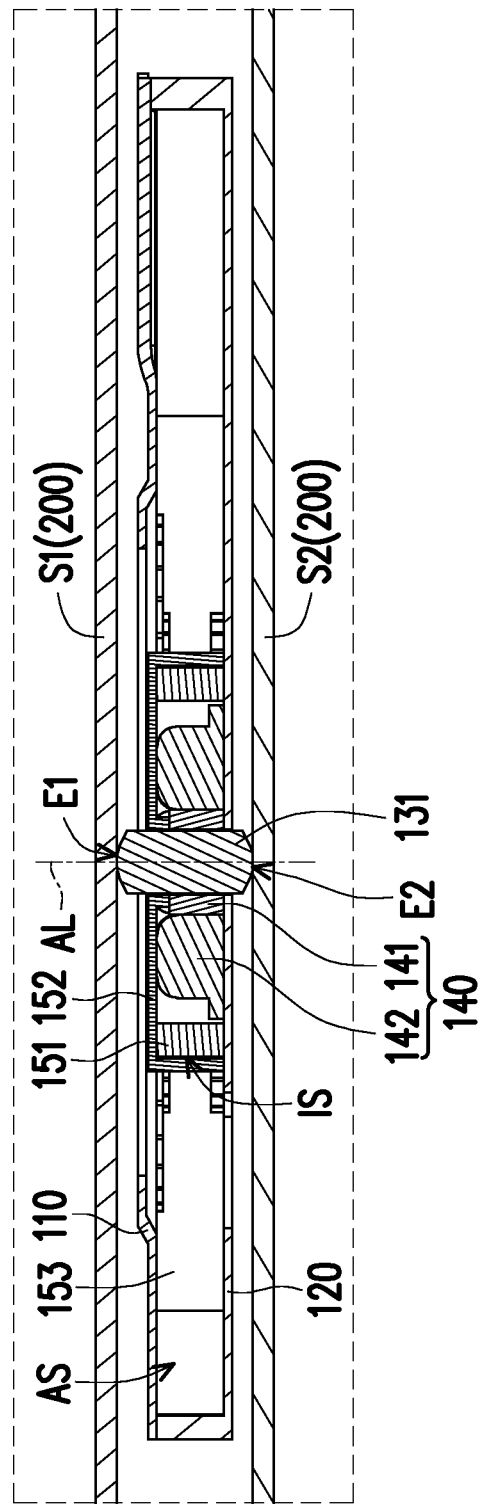
FIG. 2B is a schematic cross-sectional view of the fan module in FIG. 1A taken along line I-I.

FIG. 1A is a schematic perspective view of a fan module according to an embodiment of the disclosure. FIG. 1B is a schematic exploded view of the elements of the fan module in FIG. 1A combined with a supporting assembly. FIG. 1C is a schematic perspective view of the fan module in FIG. 1A viewed from another direction. FIG. 1D is a schematic exploded view of the elements of the fan module in FIG. 1C. FIG. 2A is a schematic planar side-view of the fan module in FIG. 1A. FIG. 2B is a schematic cross-sectional view of the fan module in FIG. 1A taken along line I-I.

Referring to FIG. 1A to FIG. 1D and FIG. 2A, a fan module 100 of the disclosure is adapted to be arranged between an upper casing S1 and a lower casing S2 of an electronic device 200. The fan module 100 is configured to operate in the electronic device 200 to exhaust hot air of the upper casing S1 and the lower casing S2 and to absorb cool air so as to facilitate heat dissipation circulation of the hot air and the cool air.

Furthermore, the fan module 100 may also dissipate heat with a heat pipe, heat dissipation board, or a heat dissipation fin for a heat-generating source such as a central processing unit or a graphic chip (not shown).

The fan module 100 of the disclosure includes a first casing 110, a second casing 120, a supporting assembly 130, a stator assembly 140, and a rotator assembly 150.

The first casing 110 includes a first vent H1 passing through the two wall surfaces inside and outside the first casing 110. The second casing 120 is connected to the first casing 110 to form an accommodating space AS. The first casing 110 and the second casing 120 are integrally connected through, for example, screw fastening, engaging, or adhering so as to form the accommodating space AS. A side opening H3 is formed between the first casing 110 and the second casing 120 and communicates with the accommodating space AS. The first vent H1 communicates with the accommodating space AS.

Referring to FIG. 1C, the second casing 120 includes multiple second vents H2 passing through the two wall surfaces inside and outside the second casing 120 and communicating with the accommodating space AS.

In an embodiment, the first casing and the second casing may be a shell structure integrally formed.

The supporting assembly 130 is located at the accommodating space AS and is disposed on the second casing 120. The supporting assembly 130 includes a first end E1 and a second end E2. The first end E1 and the second end E2 of the supporting assembly 130 respectively extend toward the first casing 110 and the second casing 120 along an axis AL.

The multiple second vents H2 surround the outer periphery of the supporting assembly 130.

The stator assembly 140 is located at the accommodating space AS. The stator assembly 140 is disposed on the second casing 120 and is disposed around the supporting assembly 130. The rotator assembly 150 is located at the accommodating space AS. The rotator assembly 150 is rotatably disposed around the stator assembly 140 and aligns with the first vent H1 of the first casing 110 and the multiple second vents H2 of the second casing 120.

The first end E1 of the supporting assembly 130 passes through the rotator assembly 150 and the first vent H1 and protrudes out of the first casing 110. The second end E2 of the supporting assembly 130 protrudes out of the second casing 120.

Referring to FIG. 2A, the supporting assembly 130 is disposed on the second casing 120. The first end E1 and the second end E2 of the supporting assembly 130 respectively abut against and support the upper casing S1 and the lower casing S2, which prevents the upper casing S1 and the lower casing S2 from deformation under external force and interfering the operation of the rotator assembly 150.

Referring to FIG. 1B and FIG. 2B, the supporting assembly 130 includes a spindle 131. The spindle 131 includes the first end E1 and the second end E2 and is presented in a cone shape.

The cross-sectional width of the first end E1 decreases gradually when extending outward in the direction along the axis AL passing through the supporting assembly 130. The cross-sectional width of the second end E2 decreases gradually when extending outward in the direction along the axis AL.

Accordingly, the first end E1 and the second end E2 are in line-contact or surface-contact with the upper casing S1 and the lower casing S2 of the electronic device 200. The spindle 131 is configured to support the upper casing S1 and the lower casing S2 so as to promote the pressure-resistance strength of the upper casing S1 and the lower casing S2.

Referring to FIG. 2A and FIG. 2B, a vertical distance D1 from the first end E1 relative to the first casing 110 is equal to a vertical distance D2 from the second end E2 relative to the second casing 120.

In other embodiments, the vertical distance D1 from the first end E1 to the first casing 110 is, for example but not limited to, greater than or less than the vertical distance D2 from the second end E2 to the second casing 120, depending on a design of the electronic device and the fan module.

Referring to FIG. 1B, FIG. 1D, and FIG. 2B, the stator assembly 140 includes a sleeve 141 and a magnetic coil 142. The sleeve 141 is fixed on the second casing 120 and is located in the accommodating space AS. The axis AL passes through the center of the sleeve 141.

The magnetic coil 142 is fixed on the second casing 120 and surrounds the sleeve 141. The magnetic coil 142 and the sleeve 141 are integrally connected and are unable to rotate relative to the second casing 120. The second end E2 of the spindle 131 passes through the sleeve 141 and a center hole CH of the second casing 120 to protrude out of the second casing 120. Specifically, the sleeve 141 is in surface-contact with an outer surface OS of the spindle 131 to generate friction so as to fix the spindle 131 in the sleeve 141.

In addition, the magnetic coil 142 is adapted to receive an external electric current to generate a magnetic field to drive the rotator assembly 150 to rotate around the axis AL relative to the first casing 110 and the second casing 120.

Referring to FIG. 1B, FIG. 1D, and FIG. 2B, the rotator assembly 150 includes a magnetic ring 151, a fan wheel 152, and multiple fan blades 153. The magnetic ring 151 surrounds the outer periphery of the magnetic coil 142 of the stator assembly 140 and is spaced apart from each other. The fan wheel 152 includes a groove G formed at one side facing the second casing 120. An inner surface IS surrounds and is formed in the groove G.

The fan wheel 152 is sleeved on the magnetic ring 151, and the magnetic ring 151 is located at the groove G and is in surface-contact with the inner surface IS. Therefore, the magnetic ring 151 and the fan wheel 152 are integrally connected. The multiple fan blades 153 are disposed at an outer annular surface RS of the fan wheel 152 and partially overlap at the first vent H1. The first end E1 of the spindle 131 passes through a rotation hole RH of the fan wheel 152 and the first vent H1 of the first casing 110 to protrude out of the first casing 110.

Furthermore, the magnetic ring 151 is adopted as, for example, a permanent magnet or a non-permanent magnet. Affected by the magnetic field of the magnetic coil 142, the magnetic ring 151, the fan wheel 152, and the multiple fan blades 153 are driven to rotate around the axis AL relative to the magnetic coil 142 of the stator assembly 140 in the accommodating space AS.

The multiple fan blades 153 generate thermal convection in the accommodating space AS during the rotation, exhausting hot air from the side opening H3 and absorbing cool air from the first vent H1 and the multiple second vents H2 to achieve heat dissipation.

Figure 3A:
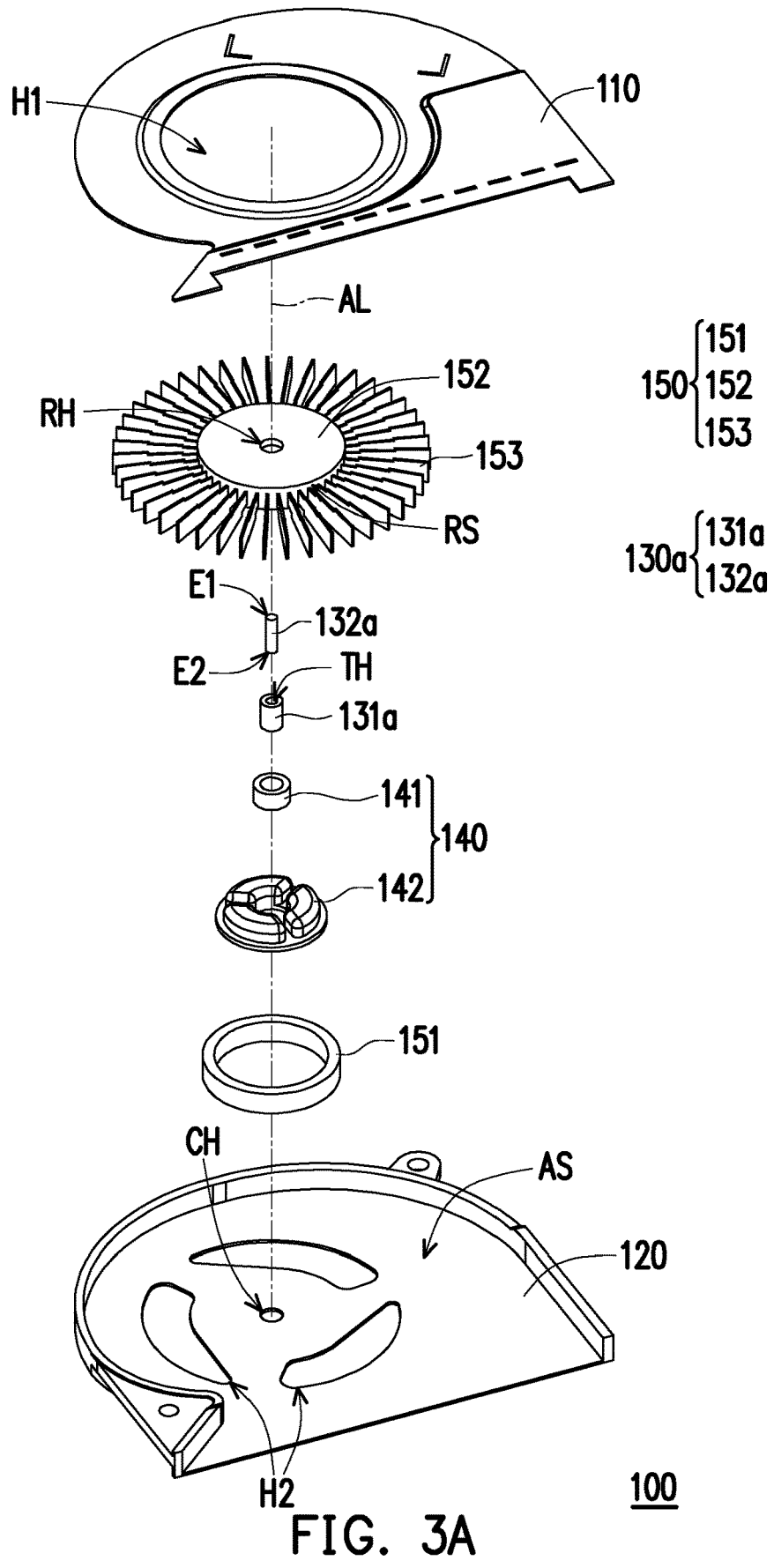
FIG. 3A is a schematic exploded view of the elements of the fan module in FIG. 1A combined with a hollow supporting assembly.
Figure 3B:
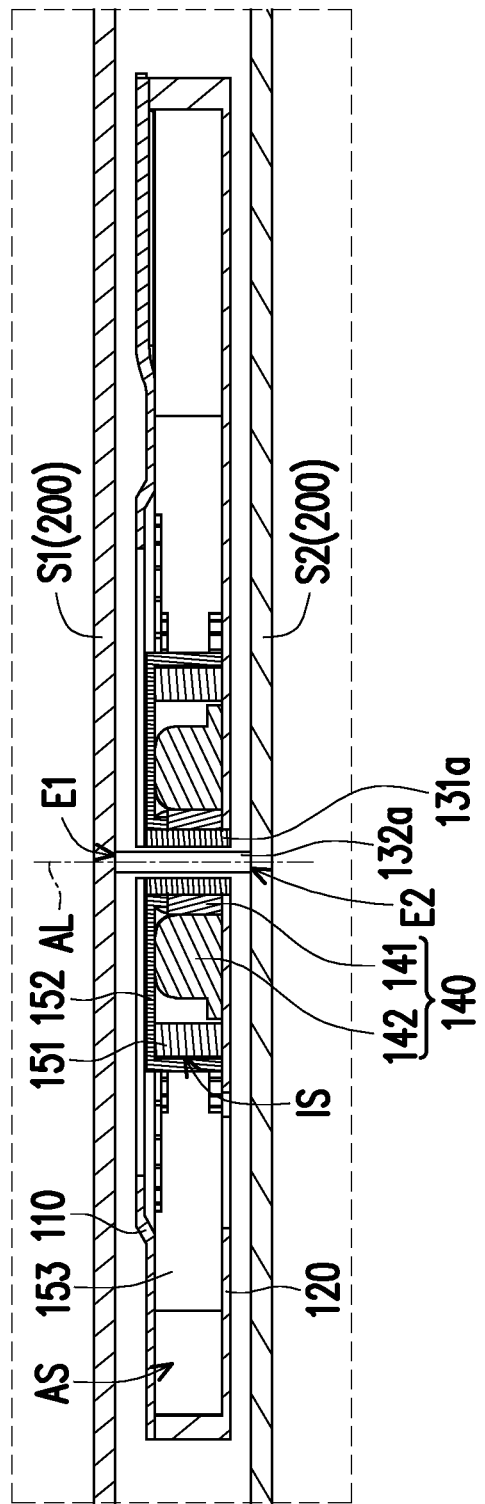
FIG. 3B is a schematic cross-sectional view of the fan module in FIG. 3A taken along line I-I.

FIG. 3A is a schematic exploded view of the elements of the fan module in FIG. 1A combined with a supporting assembly in another embodiment. FIG. 3B is a schematic cross-sectional view of the fan module in FIG. 3A taken along line I-I.

Referring to FIG. 3A and FIG. 3B, the supporting assembly 130 of the embodiment and a supporting assembly 130a in FIG. 2A are different. The difference lies in that the supporting assembly 130a includes a spindle 131a and a supporting pillar 132a.

The spindle 131a passes through the rotation hole RH of the fan wheel 152 and is in surface-contact with the sleeve 141 of the stator assembly 140 and the second casing 120. The spindle 131a is aligned with the second casing 120 and a through hole TH is formed. The supporting pillar 132a passes through the through hole TH of the spindle 131a.

The supporting pillar 132a includes the first end E1 and the second end E2 respectively protruding out of two ends of the spindle 131a so that the first end E1 and the second end E2 are in surface-contact with the upper casing S1 and the lower casing S2 of the electronic device 200. The supporting pillar 132a is configured to support the upper casing S1 and the lower casing S2 so as to promote the pressure-resistance strength of the upper casing S1 and the lower casing S2.

Referring to FIG. 3A and FIG. 3B, the vertical distance D1 from the first end E1 to the first casing 110 is equal to the vertical distance D2 from the second end E2 to the second casing 120. In other embodiments, the vertical distance D1 from the first end E1 to the first casing 110 is, for example but not limited to, greater than or less than the vertical distance D2 from the second end E2 to the second casing 120, depending on a design of the electronic device and the fan module.

Furthermore, referring to FIG. 3B, the supporting pillar 132a of the supporting assembly 130a passes through the spindle 131a. The first end E1 and the second end E2 of the supporting pillar 132a respectively abut against and support the upper casing S1 and the lower casing S2, which prevents the upper casing S1 and the lower casing S2 from deformation under external force and interfering the operation of the rotator assembly 150.

In summary, the fan module of the disclosure is adapted for an electronic device, with the first end and the second end of the supporting assembly respectively protruding out of the first casing and the second casing, when the fan module is adapted for an electronic device, the first end and the second end are configured to support a casing of the electronic device to increase its strength. In this manner, it is possible to prevent the casing from deformation under force and interfering a rotation direction of the fan module and prevent noise from being generated due to the mutual interference. Furthermore, the interference of the casing and the fan module is reduced to increase the service life of the fan module and maintain the heat dissipation efficiency.

What is claimed is:

1. A fan module, comprising:
a first casing, comprising a first vent;
a second casing, connected to the first casing to form an accommodating space;
a supporting assembly, disposed in the accommodating space, fixed on the second casing, and comprising a first end and a second end;
a stator assembly, disposed in the accommodating space, fixed on the second casing, and disposed around the supporting assembly; and
a rotator assembly, disposed in the accommodating space and rotatably disposed around the stator assembly corresponding to the first vent,
wherein, the first end passes through the rotator assembly and the first vent and protrudes out of the first casing, and the second end protrudes out of the second casing,
wherein the supporting assembly comprises a spindle and a supporting pillar, the spindle is flush with an outer surface of the second casing and includes a through hole, and the supporting pillar passes through the through hole,
wherein the supporting pillar includes the first end and the second end respectively protruding out of two ends of the spindle.

2. The fan module according to claim 1, wherein a distance from the first end to a surface of the first casing is equal to a distance from the second end to a surface of the second casing.

3. The fan module according to claim 1, wherein the stator assembly comprises a sleeve and a magnetic coil, the magnetic coil is fixed on the second casing and surrounds the sleeve, the second end of the supporting assembly passes through the sleeve and a center hole of the second casing to protrude out of the second casing.

4. The fan module according to claim 1, wherein the rotator assembly comprises a magnetic ring, a fan wheel and a plurality of fan blades, the magnetic ring surrounds an outer periphery of the stator assembly and is spaced apart from each other, the fan wheel is sleeved on the magnetic ring, and the plurality of fan blades are disposed on an outer annular surface of the fan wheel and partially overlap at the first vent.

5. The fan module according to claim 4, wherein the first end of the supporting assembly passes through a rotation hole of the fan wheel and the first vent of the first casing to protrude out of the first casing.

6. The fan module according to claim 1, wherein the second casing includes a plurality of second vents surrounding an outer periphery of the supporting assembly and communicating with the accommodating space.

7. The fan module according to claim 1, further comprising a side opening formed between the first casing and the second casing and communicating with the accommodating space.

* * * * *